US010986677B2

(12) United States Patent
Jung et al.

(10) Patent No.: US 10,986,677 B2
(45) Date of Patent: Apr. 20, 2021

(54) METHOD AND APPARATUS FOR CONNECTING TO ACCESS POINT IN WLAN NETWORK

(71) Applicant: FCI INC., Seongnam-si (KR)

(72) Inventors: Ji Young Jung, Seongnam-si (KR); Chong Hoon Lee, Seongnam-si (KR); Yong Jin Lee, Seongnam-si (KR); Chang Hwan Park, Seongnam-si (KR); Jin Wook Jeong, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 0 days.

(21) Appl. No.: 16/531,065

(22) Filed: Aug. 4, 2019

(65) Prior Publication Data
US 2020/0288331 A1   Sep. 10, 2020

(30) Foreign Application Priority Data
Mar. 5, 2019 (KR) .......................... 10-2019-0025004

(51) Int. Cl.
| H04W 76/11 | (2018.01) |
| H04W 12/00 | (2021.01) |
| A24F 40/70 | (2020.01) |
| A24F 40/465 | (2020.01) |
| A24F 40/20 | (2020.01) |
| A24F 40/51 | (2020.01) |
| H05B 6/10 | (2006.01) |
| H04W 12/037 | (2021.01) |
| H04W 24/02 | (2009.01) |
| H04W 84/12 | (2009.01) |
| B22F 7/06 | (2006.01) |

(52) U.S. Cl.
CPC ............. *H04W 76/11* (2018.02); *A24F 40/20* (2020.01); *A24F 40/465* (2020.01); *A24F 40/51* (2020.01); *A24F 40/70* (2020.01); *H04W 12/037* (2021.01); *H05B 6/108* (2013.01); *B22F 7/062* (2013.01); *H04W 24/02* (2013.01); *H04W 84/12* (2013.01)

(58) Field of Classification Search
CPC . H04W 12/00; H04W 12/0017; H04W 24/02; H04W 76/10–11; H04W 84/12
See application file for complete search history.

(56) References Cited

U.S. PATENT DOCUMENTS

| 9,301,325 | B1 * | 3/2016 | Sanap | .................. H04W 76/10 |
| 2003/0172144 | A1 * | 9/2003 | Henry | ................. H04L 61/2015 |
| | | | | 709/223 |
| 2010/0085443 | A1 * | 4/2010 | Maeda | ................... H04N 7/183 |
| | | | | 348/231.2 |

FOREIGN PATENT DOCUMENTS

| KR | 10-2012-0140110 | 12/2012 |
| KR | 10-2017-0037270 | 4/2017 |
| KR | 10-1844012 | 3/2018 |

OTHER PUBLICATIONS

Korean Office Action, Notice of Preliminary Rejection, Application No. 10-2019-0025004, Applicant: Dialog Semiconductor Korea Inc., dated Jan. 31, 2020, 6 pages.

* cited by examiner

*Primary Examiner* — Kevin C. Harper
(74) *Attorney, Agent, or Firm* — Sails Ackerman LLC; Stephen B. Ackerman

(57) ABSTRACT

Disclosed are a method and device for easily connecting to AP in WLAN. An embodiment provides a method for easily connecting to AP in WLAN to enable an IoT station to easily input connection information such as SSID, password, other information, and the like, for connecting the IoT station to the AP, and a device thereof.

11 Claims, 7 Drawing Sheets

METHOD AND APPARATUS FOR CONNECTING TO ACCESS POINT IN WLAN NETWORK

FIELD OF INVENTION

An embodiment relates to a method for connecting to an access point (AP) in a wireless local area network (WLAN) easily and a device thereof.

BACKGROUND OF INVENTION

The description below provides only background information related to the present embodiment and does not constitute the prior art.

In general, a connection scenario for connecting an Internet of Things (IoT) device to the AP is as follows. After the IoT device connects to the AP, a Service Set IDentifier (SSID), password, other information, and the like are inputted as connection information. Thereafter, when the IoT device is re-booted and then connects to the AP, the IoT device connects to the AP using the connection information (SSID, password, and other information) inputted previously. When the IoT device connects to another AP, various scenarios are needed. In other words, the IoT device may connect to another AP using initialization or change settings to connect to another AP using the Cloud.

The connection scenario for the IoT device to connect to the AP using a device provisioning protocol (DPP) which is a protocol developed by the Wi-Fi Alliance is as follows. The IoT device may perform provisioning using Bluetooth and Near Field Communication (NFC). The IoT device performs the process of connecting to the AP after acquiring AP provisioning information (SSID, password, other information, etc.) using another type of hardware (Bluetooth, NFC, etc.). At this time, the IoT device requires additional hardware (Bluetooth, NFC, etc.)

As described above, the related-art IoT device essentially requires additional devices such as a keyboard, a display, and the like to input connection information (e.g., SSID, password, other information, etc.) for connecting to the AP. However, there is a problem in that it is difficult to add a separate device for inputting the connection information due to the characteristic of the related-art IoT device.

SUMMARY OF INVENTION

The purpose of an embodiment is to provide a method and a device for easily connecting the IoT station to the AP in the WLAN network so that the connection information (for example, SSID, password, other information, and the like) for connecting the IoT station to the AP may be easily inputted.

According to an aspect of the embodiment, a method for connecting the IoT station to the AP is disclosed. The method includes receiving first configuration data using a searched channel, receiving a beacon frame packet based on the first configuration data, extracting an encryption mode and a listening channel from the beacon frame packet, receiving second configuration data using the listening channel and generating a decryption data which decrypts the second configuration data using the encryption mode, extracting connection information from the decryption data and connecting to the AP based on the connection information, extracting an IP address included in the connection information and connecting to a device corresponding to the IP address via the AP, based on confirmation from a terminal that connection to the device corresponding to the IP address is normal, communicating with the device corresponding to the IP address.

According to another aspect of the embodiment, an IoT station is disclosed. The IoT station includes a communication controller to receive first configuration data using a searched channel and receive a beacon frame packet based on the first configuration data, an encryption mode extractor to extract an encryption mode from the beacon frame packet, a listening channel extractor to extract a listening channel from the beacon frame packet, a decryption unit to receive second configuration data using the listening channel and generate decryption data which decrypts the second configuration data using the encryption mode, a connection information extractor to extract connection information from the decryption data, connect to an AP based on the connection information, extract an IP address included in the connection information, and connect to a device corresponding to the IP address via the AP, and a confirmation unit to, based on receiving a confirmation from a terminal whether connection with the device corresponding to the IP address is normal, communicate with the device corresponding to the IP address.

As described above, according to the embodiment, there is an effect of easily inputting connection information (for example, SSID, password, other information, etc.) for connecting the IoT station to the AP.

According to the embodiment of the disclosure, there is an effect that it is possible to easily connect the IoT station to the AP without inputting the SSID, password, and other information of the AP.

DETAILED DESCRIPTION OF PREFERRED EMBODIMENTS

Hereinafter an embodiment will be provided in detail with reference to attached drawings.

Figure 1:
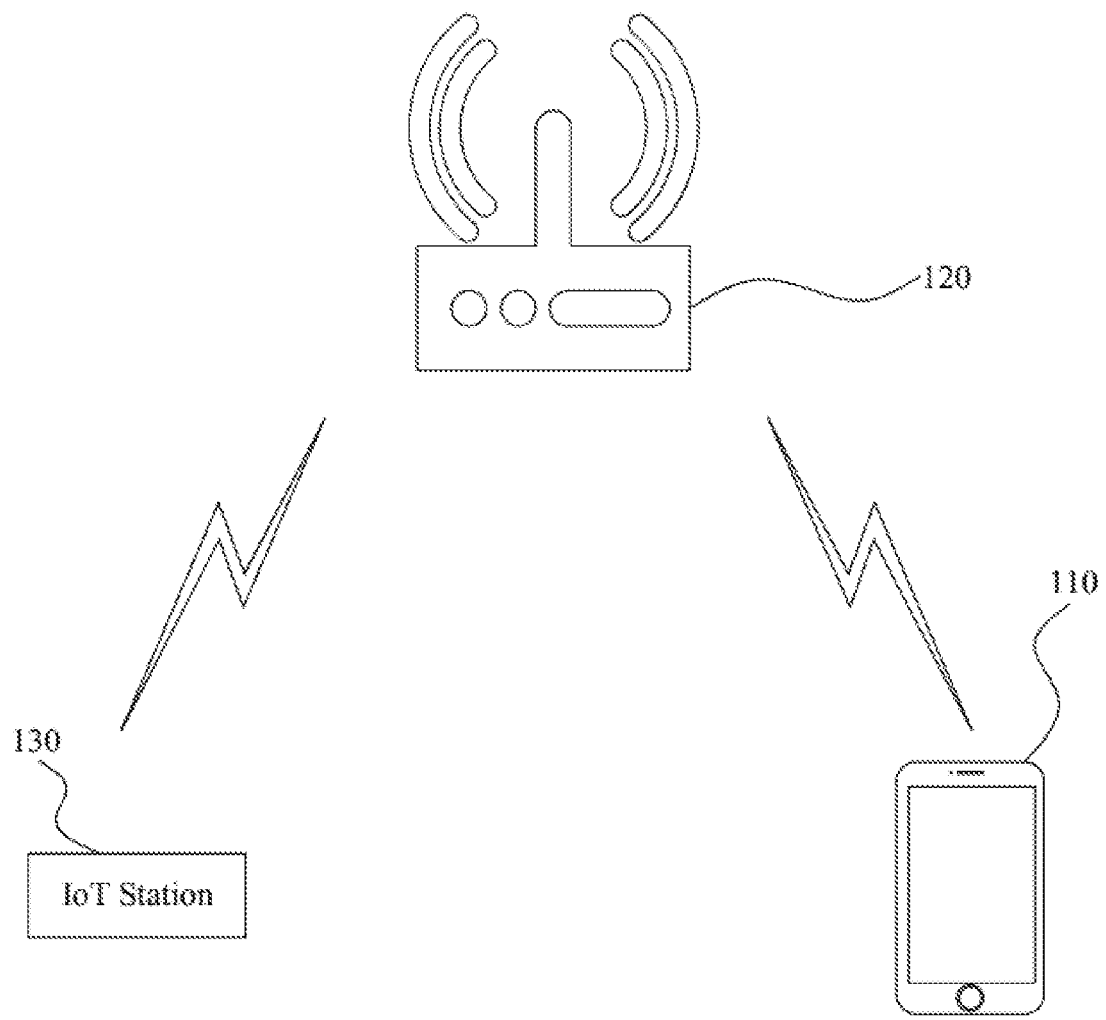
FIG. 1 is a block diagram briefly illustrating an easy connection system in the WLAN network according to an embodiment.

FIG. 1 is a block diagram briefly illustrating an easy connection system in the WLAN network according to an embodiment.

In the WLAN network according to the embodiment, the easy connection system includes a terminal 110, an AP 120, and an IoT station 130. The elements included in the easy access system in the WLAN network are not necessarily limited thereto.

The terminal 110 means an electronic device for performing voice or data communication via a network according to a user's key operation. The terminal 110 includes a memory for storing a program or a protocol for communicating with an Internet network or the IoT station 130 via the AP 120, a microprocessor for an operation and a control by executing the corresponding program, and the like.

The terminal 110 may be an electronic device such as a smartphone, a tablet, a personal digital assistant (PDA), a wireless communication terminal, a media player, and the like.

The terminal 110 according to the embodiment of the disclosure may perform a connection process with the AP 120 and then transmit, to the AP 120, connection information including SSID, password, IP address, and other information inputted as the configuration data.

When the terminal 110 performs the connection process with the AP 120 and connects to the AP 120, the terminal 110 performs address conversion for the configuration data to transmit the configuration data to the AP 120.

The terminal 110 converts an entire instruction number included in the configuration data to the multicast media access control (MAC) address recognizable by the IoT station 130. The terminal 110 may perform the configuration data encryption and transmit the encrypted configuration data to the AP 120.

The terminal 110 receives the IoT station information request including the AP connection result from the IoT station 130. The terminal 110 transmits, to the IoT station 130, the confirmation result to confirm whether the connection between the IoT station 130 and the AP 120 is a normal connection.

The AP 120 means a device for connecting data communication between the IoT station 130 and the terminal 110. The AP 120 reads the receiving side address from the transmitting side information, designates the most suitable communication path, and then transmits the same to another communication network. The AP 120 extracts the position of the data packet and designates the best communication path for the extracted position.

The AP 120 transmits the data packet to a next device along the designated communication path. The AP 120 may share several lines in the ordinary network environment. The AP 120 includes a router, a repeater, a relay, and a bridge.

The IoT station 130 means a device having a sensor and a communication function therein and capable of connecting various things to the Internet. In other words, the IoT station 130 connects various things using wireless communication. The IoT station 130 is a device that allows things to be connected to the Internet to exchange data, analyze the data by themselves, provide learned information to a user or that enables the user to remotely control the things.

The IoT station 130 may be a home appliance, a mobile device, a wearable device, and the like. The IoT station 130 may be connected to the Internet using an IP capable of distinguishing itself, and may have a sensor embedded therein for acquiring data from an external environment.

The IoT station 130 includes a memory for storing a program or a protocol for communicating with the terminal 110 or a server via the AP 120, a microprocessor for an operation and a control by executing the corresponding program, and the like.

The IoT station 130 is various devices including (i) a communication device such as a communication modem for performing communication with various devices or wired/wireless networks, (ii) a memory for storing various programs and data, and (iii) a microprocessor for an operation and a control by executing the programs. According to at least one embodiment, the memory may be a computer readable recording/storage medium such as a random access memory (RAM), a read only memory (ROM), a flash memory, an optical disk, a magnetic disk, or a solid state disk (SSD). According to at least one embodiment, the microprocessor may be programmed to selectively perform one or more of the operations and functions described in the specification. According to at least one embodiment, the microprocessor may be implemented with hardware such as an application specific integrated circuit (ASIC), fully or partially.

The memory stores related data and programs, and the processor reads and processes the related data. In case of the processor, one processor may perform each function as described above, or a plurality of processors may share and process the functions. The processor may be implemented as a general-purpose processor or a chip separately made to perform the functions.

The IoT station 130 may be easily connected to the AP 120 using a program in an embedded form.

The IoT station 130 simplifies a process to connect to the AP 120. The IoT station 130 may be easily connected to the AP 120 without using additional hardware (HW). The IoT station 130 may receive the connection information from the AP 120 regardless of the connection information (SSID, password, other information, and the like) for connecting to the AP 120, or an encryption method (wired equivalent privacy (WEP), temporal key integrity protocol (TKIP), advanced encryption standard (AES), etc.) for connecting to the AP 120.

The IoT station 130 transmits, to the terminal 110, information determining whether the connection state is normal/abnormal after being connected to the AP 120. The IoT station 130 may initialize communication or perform communication according to the result of the confirmation received from the terminal 110.

The IoT station 130 according to the embodiment receives the first configuration data using the searched channel. The IoT station 130 receives a beacon frame packet based on the first configuration data. The IoT station 130 extracts the encryption mode and listening channel from the beacon frame packet.

The IoT station 130 receives the second configuration data using the extracted listening channel. The IoT station 130 generates the decrypted data which is obtained by decrypting the second configuration data using the extracted encryption mode.

The IoT station 130 extracts connection information from the decrypted data, and connects to the AP 120 based on the connection information. The IoT station 130 extracts the IP address included in the connection information and connects to a device corresponding to the IP address via the AP. The IoT station 130, when receiving confirmation whether the connection with a device corresponding to an IP address is normal or not from the terminal 110, performs communication with the device corresponding to the IP address.

Figure 2:
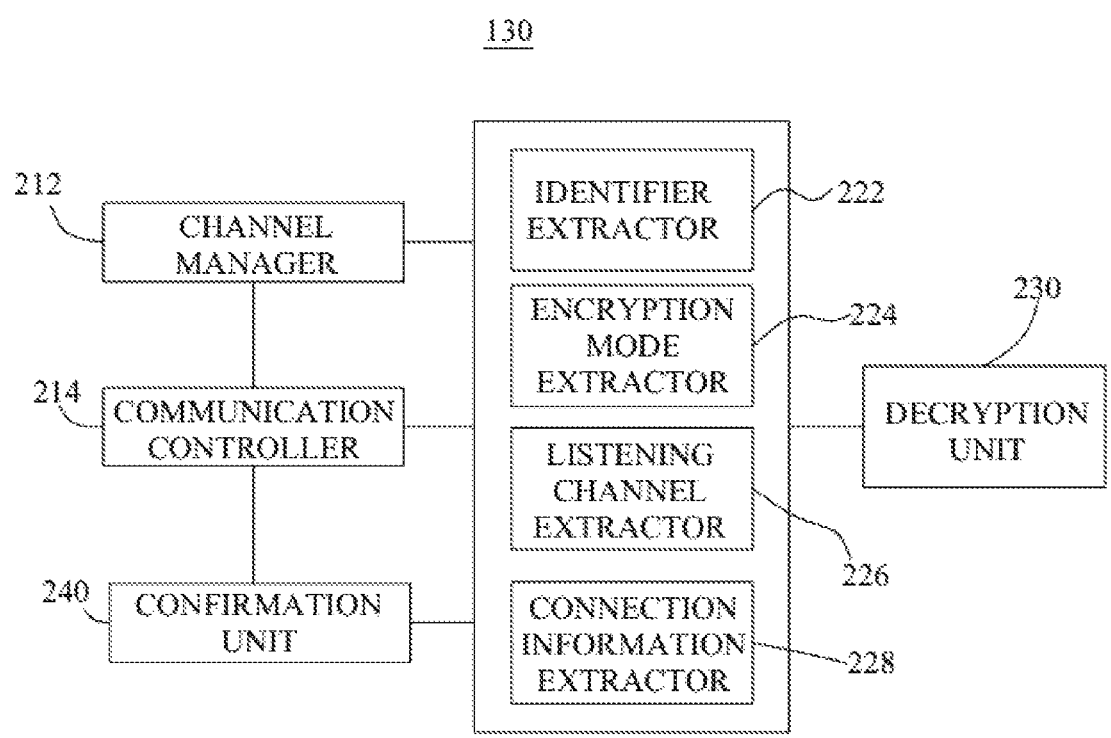
FIG. 2 is a block diagram briefly illustrating the IoT station according to an embodiment.

FIG. 2 is a block diagram briefly illustrating the IoT station according to an embodiment.

The IoT station 130 according to the embodiment includes a channel manager 212, a communication controller 214, an identifier extractor 222, an encryption mode extractor 224, a listening channel extractor 226, a connection information extractor 228, a decryption unit 230, and a confirmation unit 240. The elements included in the IoT station 130 are not limited thereto.

Each element included in the IoT station 130 may be connected to the communication path which connects software modules or hardware modules inside the device and may interact with each other in an organic manner. The elements perform communication using one or more communication bus or a signal line.

Each element of the IoT station 130 as illustrated in FIG. 2 means a unit of processing at least one function or operation, and may be implemented with the software module, hardware module, or the combination of software and hardware.

The channel manager 212 searches for a plurality of channels. The channel manager 212 changes a current channel to a listening channel extracted by the listening channel extractor 226.

The communication controller 214 receives the first configuration data from the AP 120 using a channel where the first configuration data is present from among the plurality of searched channels.

The communication controller 214 confirms that the first configuration data is information which is transmitted to the IoT station 130 by using the indication number allocated with the 12-digit hexadecimal number to the multicast address field included in the first configuration data.

The communication controller 214 receives the beacon frame packet based on the first configuration data. In other words, the communication controller 214 receives the beacon frame packet from the AP 120 corresponding to the Basic Service Set IDentifier (BSSID) extracted by the identifier extractor 222.

The communication controller 214 receives the second configuration data from the AP 120 using the listening channel. In other words, the communication controller 214, when the current channel is changed to the listening channel by the channel manager 212, receives the second configuration data from the AP 120 using the listening channel.

When receiving the second configuration data from the AP 120, the communication controller 214 receives the transmission packet number which is matched to the indication number that is divided by the predetermined number (for example, four) as well.

The indication number of 12-digit hexadecimal number is allocated to the second configuration data. The second configuration data includes the SSID, password, and IP address which are inputted from the terminal 110. The second configuration data is converted from the indication number to the multicast data format by the terminal 110.

The second configuration data is information encrypted by an arbitrary user encryption algorithm excluding the total length, using the data length information included in the configuration data, according to a predetermined data conversion rule by the terminal 110.

The communication controller 214 connects to the AP 120 based on the connection information extracted by the connection information extractor 228. In other words, the communication controller 214 performs the connection process with the AP 120 using the connection information (SSID, password, and IP address) extracted by the connection information extractor 228.

The communication controller 214 connects to a device corresponding to the IP address based on the IP address included in the connection information extracted by the connection information extractor 228. The communication controller 214 connects to the device corresponding to the IP address via the AP 120.

The identifier extractor 222 extracts a Basic Service Set IDentifier from the first configuration data. The identifier extractor 222 extracts, from the beacon frame packet, direct sequence parameter set information element (IE), wireless protected access (WPA) IE, and robust security network (RSN) IE.

The encryption mode extractor 224 extracts the encryption mode from the beacon frame packet. To be specific, the encryption mode extractor 224 extracts the encryption mode from the WPA IE and RSN IE extracted by the identifier extractor 222.

The listening channel extractor 226 extracts the listening channel from the beacon frame packet. Specifically, the listening channel extractor 226 extracts the listening channel based on the direct sequence parameter set IE extracted from the identifier extractor 222. The listening channel extractor 226 determines the channel extracted based on the direct sequence parameter set IE to the listening channel.

The connection information extractor 228 extracts connection information from the decrypted data, and enables the communication controller 214 to connect to the AP 120 based on the connection information. The connection information extractor 228 extracts the connection information including the SSID, password, and IP address from the decryption data generated by the decryption unit 230. The connection information extractor 228 extracts the IP address included in the connection information and enables the communication controller 214 to be connected to a device corresponding to the IP address via the AP.

The decryption unit 230 enables the communication controller 214 to receive the second configuration data using the listening channel. The decryption unit 230 generates the decryption data which decrypts the second configuration data using the encryption mode of the encryption mode extractor 224. The decryption unit 230 decrypts the second configuration data using that the data length of the packet changes in a uniform manner according to the encryption mode extracted by the encryption mode extractor 224.

The confirmation unit 240, when receiving confirmation from the terminal 110 whether connection to the device corresponding to the IP address is normal, enables the communication controller 214 to perform communication with the device corresponding to the IP address.

The confirmation unit 240 transmits, to the terminal, a request for IoT station information including the AP connection result of connecting to the device corresponding to the IP address included in the connection information. The confirmation unit 240 receives, from the terminal 110, an IoT station information response to correspond to the IoT station information request.

When receiving the IoT station information response from the terminal 110, the confirmation unit 240 may recognize that connection with a device corresponding to the IP address is normal and enables communication with the device corresponding to the IP address. The confirmation unit 240, when the IoT station information response is not received from the terminal 110, initializes connection information.

Figure 3:
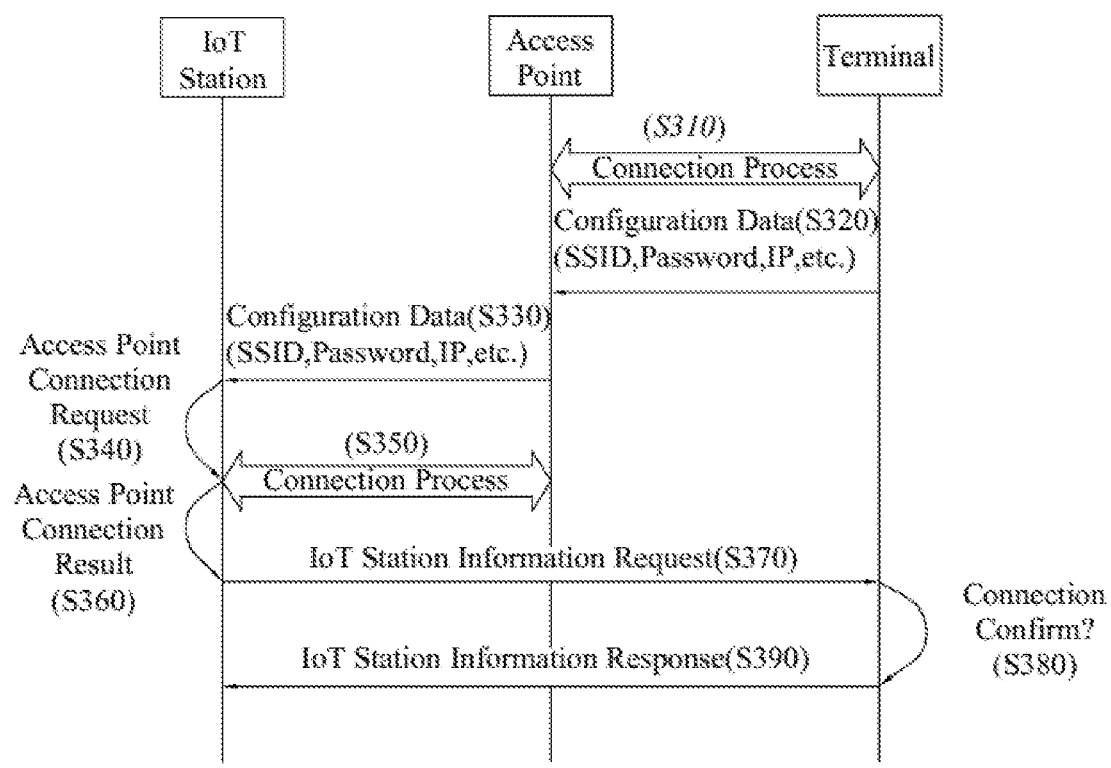
FIG. 3 is a flowchart to describe an entire method for easily connecting to the AP in the WLAN network according to an embodiment.

FIG. 3 is a flowchart to describe an entire method for easily connecting to the AP in the WLAN network according to an embodiment.

The terminal 110 performs a connection process with the AP 120 in step S310. In step S310, the terminal 110 performs authentication procedure using security parameter in accordance with Establishing the IEEE 802.11 Association of IEEE 802.11 and then connects to the AP 120.

The terminal 110 inputs SSID, password, IP, and other information as configuration data to the AP 120 in step S320.

The AP 120 transmits, to the IoT station 130, configuration data (SSID, password, IP, and other information) in step S330.

When receiving the configuration data (SSID, password, IP, and other information) from the AP 120, the IoT station 130 performs AP connection request based on the configuration data in step S340.

The IoT station 130 performs a connection process with the AP 120 in step S350. The IoT station 130 connects to the AP 120 and then generates the AP connection result in step S360.

The IoT station 130 transmits an IoT station information request including the AP connection result to the terminal 110 in step S370. When the terminal 110 receives the IoT station information request from the IoT station 130, the terminal 110 performs connection confirmation on the connection between the IoT station 130 and the AP 120 in step S380.

When the connection confirmation with respect to the connection between the IoT station 130 and the AP 120 is completed, the terminal 110 transmits the IoT station information response corresponding to the IoT station information request to the IoT station 130 in step S390.

In FIG. 3, it has been described that steps S310 to S390 are sequentially executed, but it is not limited thereto. In other words, since it would be applicable to vary the steps described in FIG. 3 or to execute one or more steps in parallel, FIG. 3 is not limited to a time series order.

As described above, the entire method for easily connecting the AP in the WLAN network according to the embodiment shown in FIG. 3 may be implemented as a program and recorded on a computer-readable recording medium. A recording medium which records a program to implement the entire method to easily connect to the AP in the WLAN and is readable by a computer includes all kinds of recording devices in which data which may be read by a computer system is stored.

Figure 4:
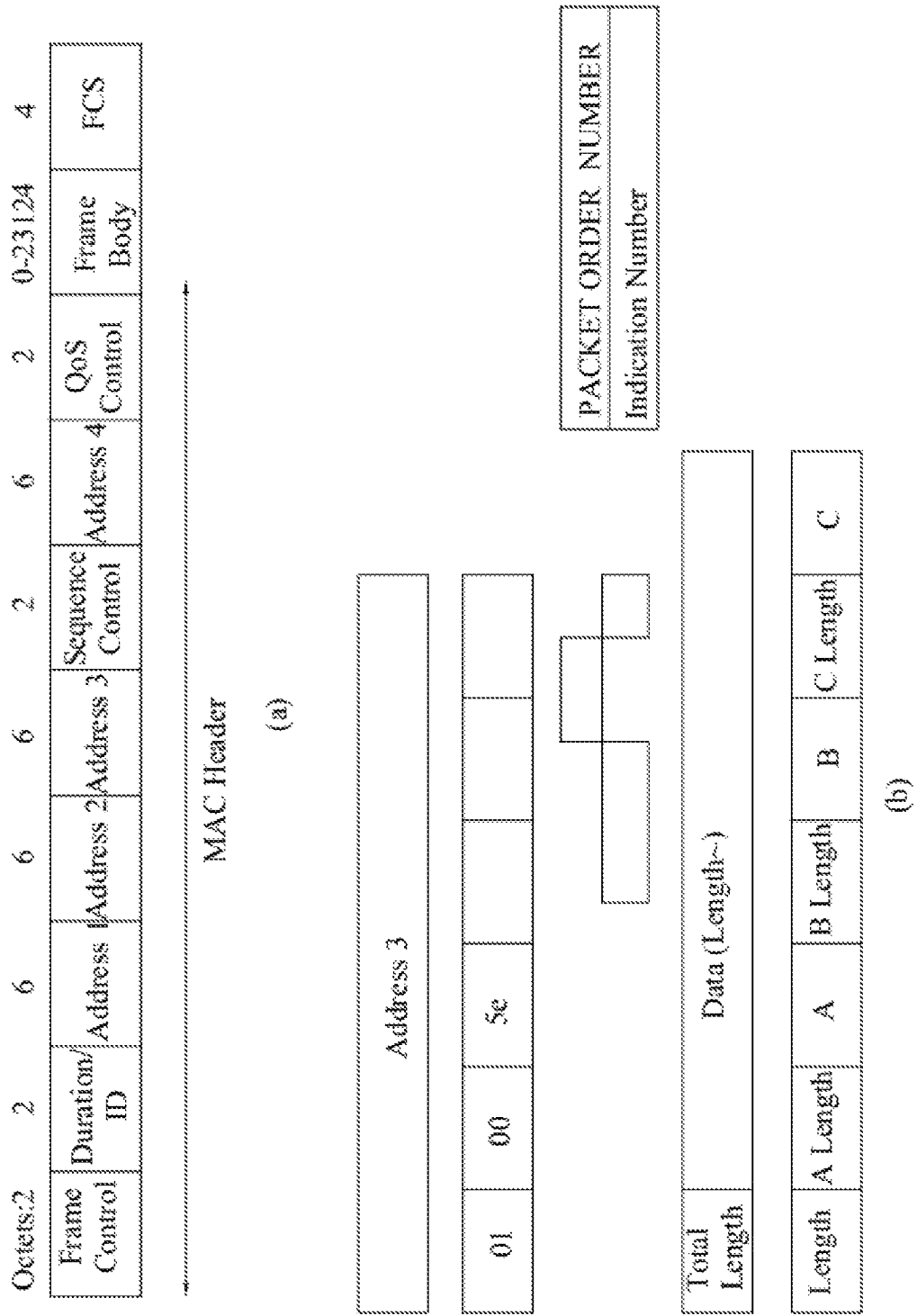
FIG. 4 is a view to describe a configuration of an address according to an embodiment.

FIG. 4 is a view to describe a configuration of an address according to an embodiment.

The address of configuration data which is transmitted from the terminal 110 to the AP 120, and from the AP 120 to the IoT station 130 is as illustrated in FIG. 4.

The usage field of the configuration data uses multicast MAC address and 3 octets are allocated as shown in FIG. 4A.

The packet order in the usage field of the configuration data is allocated with 2 bytes and the indication number is allocated with 3 bytes as shown in FIG. 4A.

The total indication number of the configuration data is allocated with 12-digit hexadecimal number. The total indication number of the configuration data is scalable, and divided transmission by four times is available.

The configuration data is available up to 255 bytes, and data length information is included. The configuration data is encrypted using the encryption algorithm predefined by the terminal 110 and the IoT station 130.

Figure 5:
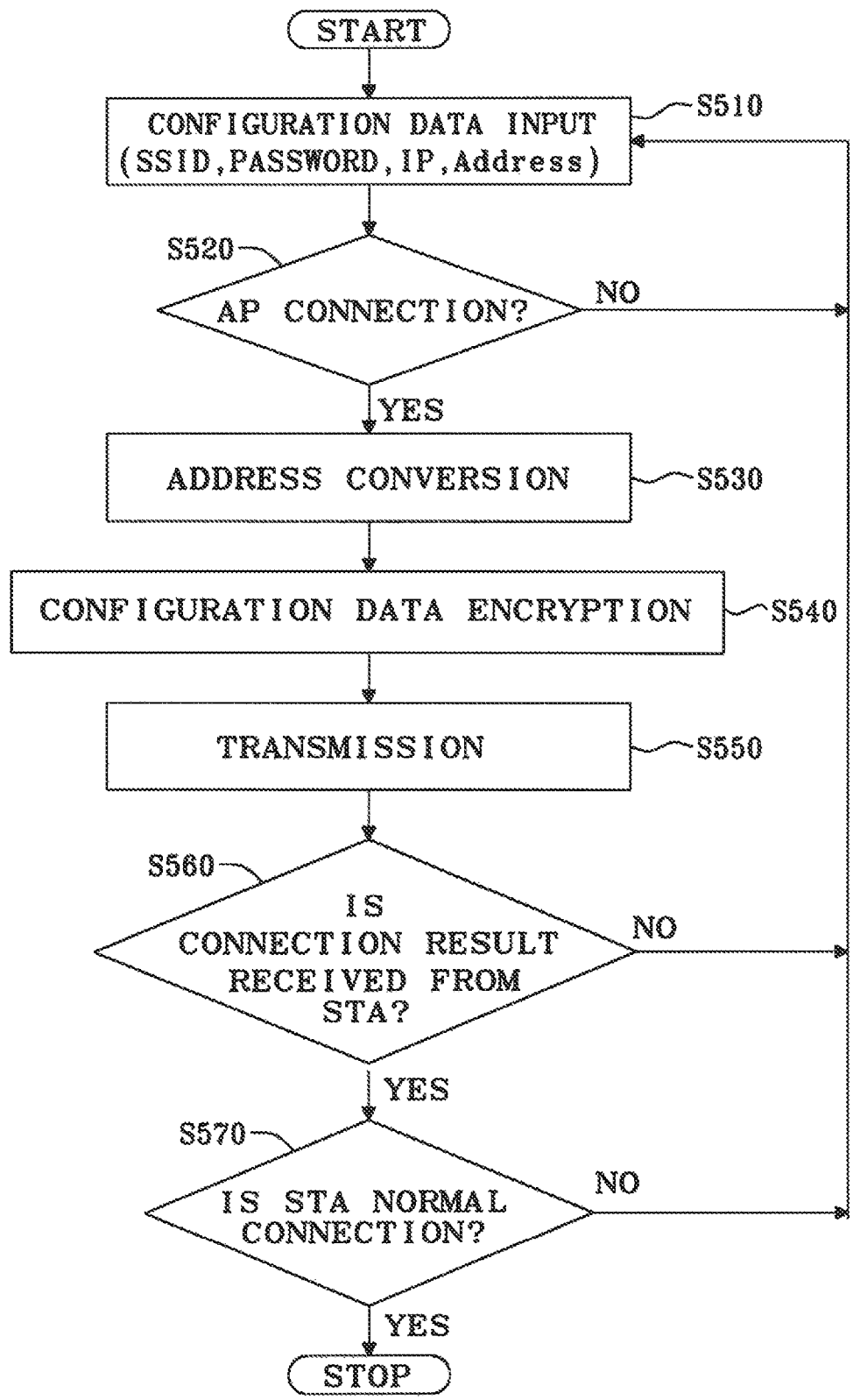
FIG. 5 is a flowchart to describe an operation method of a terminal for connection to the AP in the WLAN network according to an embodiment.

FIG. 5 is a flowchart to describe an operation method of a terminal for connection to the AP in the WLAN network according to an embodiment.

After performing connection process with the AP 120, the terminal 110 receives an input of SSID, password, IP address, and other information as configuration data in step S510.

The terminal 110 confirms whether the terminal 110 connects to the AP 120 in step S520. In step S520, the terminal 110 performs authentication procedure using security parameter according to establishing the IEEE 802.11 association of IEEE 802.11 and then connects to the AP 120.

As a result of confirmation in step S520, when the terminal 110 is connected to the AP 120 by performing a connection process with the AP 120, the terminal 110 performs address conversion for the configuration data to transmit the configuration data to the AP in step S530.

As a result of confirmation in step S520, when the terminal 110 is not connected to the AP 120, the terminal 110 returns to step S510.

In step S530, the terminal 110 uses a 12-digit hexadecimal indication number for the configuration data. The terminal 110 divides the indication number into a predetermined number (for example, four). The terminal 110 matches the divided indication number with a transmission packet number.

The terminal 110 encrypts the configuration data in which the divided indication number is matched with the transmission packet number in step S540. In step S540, the terminal 110 encrypts data using an arbitrary user encryption algorithm excluding the total length using the data length information included in the configuration data according to the data conversion rule.

The terminal 110 transmits the encrypted configuration data to the AP 120 in step S550. In step S550, the terminal 110 converts the code of the converted data to the packet length and transmits the encrypted configuration data using the converted address to the AP 120.

The terminal 110 confirms whether to receive the IoT station information request including the AP connection result from the IoT station 130 in step S560.

In step S560, the terminal 110 receives the IoT station information request from the IoT station 130. The terminal 110 extracts the AP connection result included in the IoT station information request.

As a result of confirmation of the step S560, when the IoT station information request including the AP connection result is received from the IoT station 130, the terminal 110 confirms whether the connection between the IoT station 130 and the AP 120 is normal in step S570.

As a result of confirmation in step S560, when the IoT station information request including the AP connection result is not received from the IoT station 130, the terminal 110 returns to the step S510.

As a result of confirmation in step S570, if it is confirmed that the connection between the IoT station 130 and the AP 120 is a normal connection, the terminal 110 completes the connection confirm of the connection between the IoT station 130 and the AP 120, and transmits the IoT station information response corresponding to the IoT station information request to the IoT station 130.

As a result of confirmation in step S570, if it is confirmed that the connection between the IoT station 130 and the AP 120 is abnormal, the terminal 110 returns to the step S510.

In FIG. 5, it has been described that steps S510 to S570 are sequentially executed, but it is not limited thereto. In other words, since it would be applicable to vary the steps described in FIG. 5 or to execute one or more steps in parallel, FIG. 5 is not limited to a time series order.

As described above, the operation method of the terminal for easily connecting the AP in the WLAN network according to the embodiment shown in FIG. 5 may be implemented as a program and recorded on a computer-readable recording medium. A recording medium which records a program to implement the operation method to easily connect to the AP in the WLAN and is readable by a computer includes all kinds of recording devices in which data which may be read by a computer system is stored.

Figure 6:
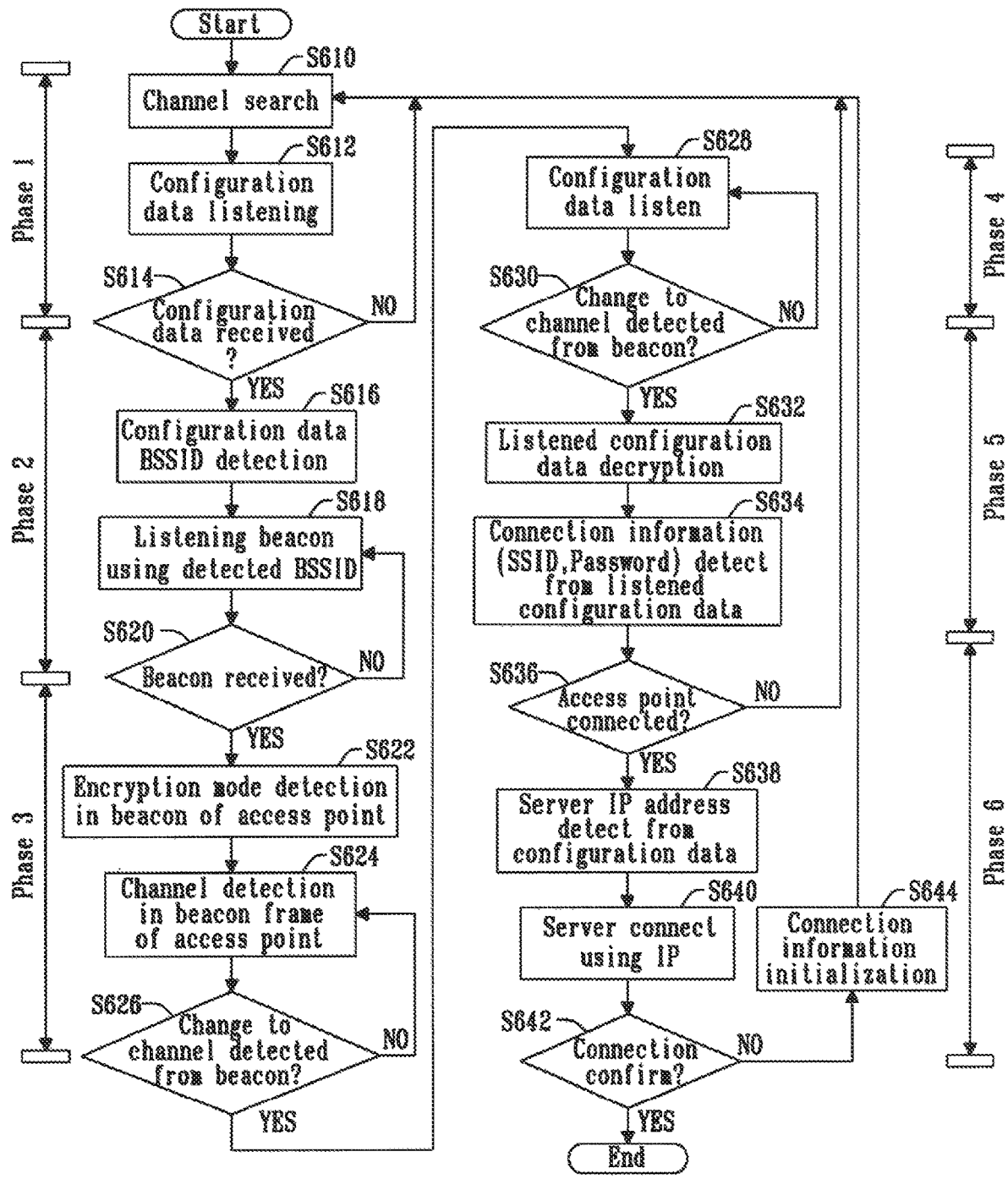
FIG. 6 is a flowchart to describe a specific method for easily connecting to the AP in the WLAN network according to an embodiment.

FIG. 6 is a flowchart to describe a specific method for easily connecting to the AP in the WLAN network according to an embodiment.

The IoT station 130 performs channel search in step S610. The IoT station 130 listens to configuration data by channels in step S612. In step S612, the IoT station 130 confirms whether the configuration data is present in each channel using the address field.

The IoT station 130 confirms whether the configuration data which is present for each channel is received to the IoT station in step S614. In step S614, the IoT station 130 confirms whether the configuration data present in each channel is information that is transmitted to the IoT station using 12-digit hexadecimal indication number.

In step S614, the IoT station 130 confirms whether the information is transmitted as the configuration data of a specific IoT station or a plurality of IoT stations according to the combination of indication numbers in the configuration data.

The steps S610, S612, and S614 correspond to phase 1.

As a result of confirmation of the step S614, when the configuration data which is present in each channel is information received to the IoT station 130, the IoT station 130 extracts a Basic Service Set IDentifier (BSSID) using the received configuration data in step S616.

The IoT station 130 listens to the beacon with respect to the corresponding channel using the extracted BSSID in step S618. In step S618, the IoT station 130 confirms whether the beacon frame packet is present using the extracted BSSID. The IoT station 130 extracts the beacon frame packet using the extracted BSSID.

The IoT station 130 confirms whether the beacon frame packet is received to the IoT station 130 in step S620. In step S620, the IoT station 130 confirms whether the beacon frame packet is information transmitted to the IoT station 130.

Steps S616, S618, and S620 correspond to phase 2.

As a result of confirmation of step S620, when the beacon frame packet is information received by the IoT station 130, the IoT station 130 extracts an encryption mode from the beacon frame packet in step S622. In step S622, the IoT station 130 extracts direct sequence parameter set information element (IE), wireless protected access (WPA) IE, robust security network (RSN) IE from the extracted beacon frame packet. The IoT station 130 extracts the encryption mode from the WPA IE and RSN IE.

The IoT station 130 extracts a channel from the beacon frame packet in step S624. In step S624, the IoT station 130 finalizes a channel extracted from the direct sequence parameter set IE as a listening channel.

The IoT station 130 confirms whether the channel is changed to the listening channel extracted from the direct sequence parameter set IE in step S626.

Steps S622, S624, and S626 correspond to phase 3.

In step S626, when the channel is changed to the listening channel extracted from the direct sequence parameter set IE, the IoT station 130 listens to the configuration data from the AP 120 using the listening channel in step S628.

The IoT station 130 receives the configuration data from the AP 120 by changing to the listening channel finalized in step S628.

The IoT station 130 changes to the finalized listening channel and confirms whether all the configuration data is listened from the AP 120 in step S630. In step S630, the IoT station 130 confirms whether the configuration data is received all from the AP 120 using the finalized listening channel.

Steps S628 and S630 correspond to phase 4.

As a result of confirmation of step S630, when listening to all the configuration data from the AP 120, the IoT station 130 decrypts the listened configuration data in step S632. In step S632, the IoT station 130 decrypts the data which is extracted and finally combined data in step S628 according to an arbitrarily-set encryption method.

The IoT station 130 extracts connection information (SSID, password, IP address, and the like) related to the AP 120 from the decrypted configuration data in step S634. In step S634, the IoT station 130 confirms connection data included in the configuration data using the encryption mode extracted in S622. In other words, the AP 120 confirms connection data included in the configuration data which is extracted as a packet using that data length of a packet is uniformly changed according to an encryption mode.

The IoT station 130 confirms whether the IoT station 130 connects to the AP 120 in step S636. In step S636, the IoT station 130 performs connection process with the AP 120 using the connection information.

Steps S632, S634, and S636 correspond to phase 5.

The IoT station 130 extracts the server IP address from the configuration data in step S638. The IoT station 130 connects to a server corresponding to the server IP address via the AP 120 in step S640.

The IoT station 130 connects to the AP 120 and then generates an AP connection result. The IoT station 130 transmits the IoT station information request including the AP connection result to the terminal 110. When receiving the IoT station information request from the IoT station 130, the terminal 110 performs connection confirm for connection between the IoT station 130 and the AP 120.

The IoT station 130 confirms whether the connection confirm for connection between the IoT station 130 and the AP 120 is completed from the terminal 110 in step S642. In step S642, the IoT station 130, when receiving the IoT station information response corresponding to the IoT station information request from the terminal 110, recognizes that the confirmation is completed.

In other words, the IoT station 130 confirms connection state using the extracted server IP address, and when the connection to the server corresponding to the server IP address is normal, performs a function of the IoT station 130.

In step S642, when connection confirmation for connection between the IoT station 130 and the AP 120 is not completed from the terminal 110, the IoT station 130 initializes connection information in step S644. In step S642, the IoT station 130 performs initialization when connection to the server corresponding to the server IP address is not normal.

Steps S638, S640, S642, and S644 correspond to phase 6.

In FIG. 6, it is described that the step S610 to step S644 are performed sequentially, but it is not limited thereto. In other words, since it would be applicable to vary the steps described in FIG. 6 or to execute one or more steps in parallel, FIG. 6 is not limited to a time series order.

As described above, the specific method for easily connecting the AP in the WLAN network according to the embodiment shown in FIG. 6 may be implemented as a program and recorded on a computer-readable recording medium. A recording medium which records a program to implement the specific method to easily connect to the AP in the WLAN and is readable by a computer includes all kinds of recording devices in which data which may be read by a computer system is stored.

Figure 7:
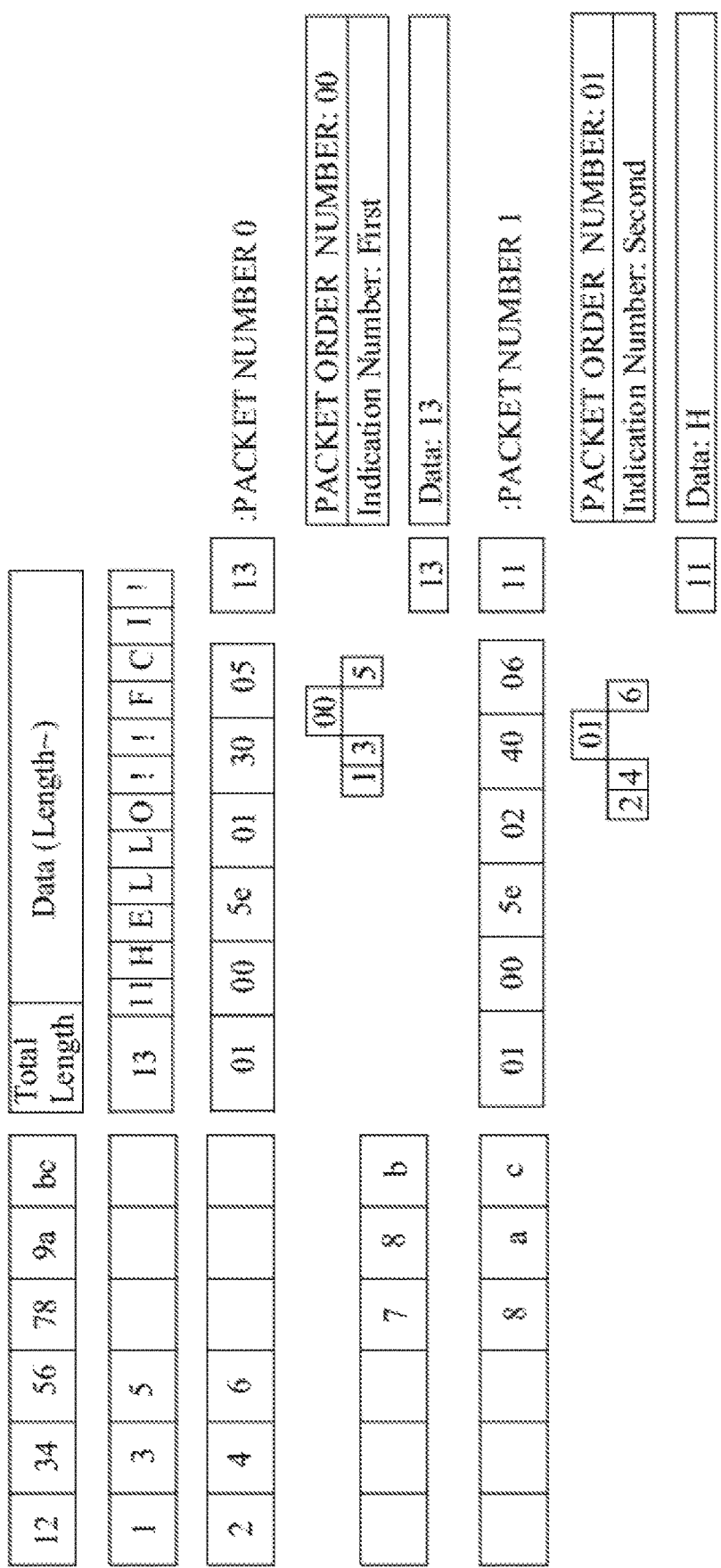
FIG. 7 is a view to describe an example of configuration of an address according to an embodiment.

FIG. 7 is a view to describe an example of configuration of an address according to an embodiment.

An example of configuring address of the configuration data which is transmitted from the terminal 110 to the AP 120, and from the AP 120 to the IoT station 130 is as shown in FIG. 7.

As illustrated in FIG. 7, the 12-digit hexadecimal number "123456789 1bc" is input as the indication number, and "HELLO!!FCI!!" is input to the data field. In the data field, the hexadecimal number is input as a character code, vendor-specific encryption is performed.

The total length of the configuration data has vendor specific encryption data size+1 (total length size). The total length size is available from 0 to FF(255). For example, when "106" is allocated to the data field, "SSID(32)"+"Password(63)"+"IP Address(4)"+"Parameter Length(6)"+ "1(Total Length)" may be allocated.

The above description is merely illustrative of the technical idea of the embodiment, and it will be understood by those of ordinary skill in the art that various changes in form and details may be made therein without departing from the essential characteristics of the embodiment. Accordingly, example embodiments are provided to describe the technical idea, not to limit the technical idea, and the scope of technical idea of the disclosure is not limited by the example embodiments. The scope of the embodiments should be interpreted based on the claims below and all technical ideas in the same scope therewith would be interpreted to be within the scope of rights of the example embodiment of the disclosure.

What is claimed is:

1. A method for connecting an Internet of Things (IoT) station to an access point (AP), the method comprising:
   receiving first configuration data using a searched channel;
   receiving a beacon frame packet based on the first configuration data;
   extracting an encryption mode and a listening channel from the beacon frame packet;
   receiving second configuration data using the listening channel and generating a decryption data which decrypts the second configuration data using the encryption mode;
   extracting connection information from the decryption data and connecting to the AP based on the connection information;
   extracting an IP address included in the connection information and connecting to a device corresponding to the IP address via the AP; and
   based on confirmation from a terminal that connection to the device corresponding to the IP address is normal, communicating with the device corresponding to the IP address.

2. The method of claim 1, comprising:
   after searching a plurality of channels, receiving the first configuration data using a channel in which the first configuration data is present among the searched channels, and confirming that the first configuration data is information transmitted to the IoT station using an indication number allocated to a multicast address field included in the first configuration data.

3. The method of claim 2, comprising:
   extracting a Basic Service Set Identifier (BSSID) from the first configuration data and receiving the beacon frame packet from the AP corresponding to the BSSID.

4. The method of claim 3, comprising:
   after extracting direct sequence parameter set information element (IE), wireless protected access (WPA) IE, robust security network (RSN) IE from the beacon frame packet, detecting an encryption mode from the WPA IE and the RSN IE, finalizing an extracted channel based on the direct sequence parameter set IE as a listening channel and changing a current channel to the listening channel.

5. The method of claim 4, comprising:
   after changing to the listening channel, receiving the second configuration data from the AP using the listening channel and decrypting the second configuration data using that data length of a packet is uniformly changed according to the encryption mode.

6. The method of claim 5, comprising:
   extracting the connection information including SSID, password, and IP address from the decryption data, performing connection process with the AP using the connection information, and connecting to the device corresponding to the IP address via the AP.

7. The method of claim 5, comprising:
   transmitting IoT station information request including a result of an AP connection to the device corresponding to the IP address to the terminal, based on receiving an IoT station information response corresponding to the IoT station information request from the terminal, performing communication with the device corresponding to the IP address by recognizing that connection with the device corresponding to the IP address is normal, and based on not receiving the IoT station information response from the terminal, initializing the connection information.

8. The method of claim 1, wherein the second configuration data is allocated with a 12-digit hexadecimal indication number, comprises SSID, password, and IP address which are inputted from the terminal, and is information which is converted from the indication number to a multicast data format by the terminal.

9. The method of claim 8, comprising:
   based on receiving the second configuration data from the AP, receiving a transmission packet number matched to the indication number which is divided by a predetermined number as well.

10. The method of claim 9, wherein the second configuration data is information encrypted by an arbitrary user encryption algorithm excluding total length, using data length information included in the configuration data, according to a predetermined data conversion rule by the terminal.

11. An IoT station comprising:
    a communication controller to receive first configuration data using a searched channel and receive a beacon frame packet based on the first configuration data;
    an encryption mode extractor to extract an encryption mode from the beacon frame packet;
    a listening channel extractor to extract a listening channel from the beacon frame packet;
    a decryption unit to receive second configuration data using the listening channel and generate decryption data which decrypts the second configuration data using the encryption mode;
    a connection information extractor to extract connection information from the decryption data, connect to an AP based on the connection information, extract an IP address included in the connection information, and connect to a device corresponding to the IP address via the AP; and a confirmation unit to, based on receiving a confirmation from a terminal whether connection with the device corresponding to the IP address is normal, communicate with the device corresponding to the IP address.

\* \* \* \* \*